United States Patent
Castelain

(10) Patent No.: US 9,735,997 B2
(45) Date of Patent: Aug. 15, 2017

(54) METHOD, DEVICE AND COMPUTER PROGRAM FOR CORRECTING A FREQUENCY SHIFT ON SYMBOLS RECEIVED BY A RECEIVER

(71) Applicant: MITSUBISHI ELECTRIC CORPORATION, Tokyo (JP)

(72) Inventor: Damien Castelain, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/433,514

(22) PCT Filed: Aug. 26, 2013

(86) PCT No.: PCT/JP2013/073459
§ 371 (c)(1),
(2) Date: Apr. 3, 2015

(87) PCT Pub. No.: WO2014/057742
PCT Pub. Date: Apr. 17, 2014

(65) Prior Publication Data
US 2015/0244555 A1    Aug. 27, 2015

(30) Foreign Application Priority Data

Oct. 9, 2012  (EP) .................................... 12187755

(51) Int. Cl.
*H04L 27/06*    (2006.01)
*H04L 27/26*    (2006.01)
(Continued)

(52) U.S. Cl.
CPC ...... *H04L 27/2663* (2013.01); *H04J 11/0023* (2013.01); *H04L 7/0041* (2013.01);
(Continued)

(58) Field of Classification Search
CPC ............. H04L 27/2657; H04L 27/2675; H04L 27/2613; H04L 27/2662; H04L 27/2656;
(Continued)

(56) References Cited

U.S. PATENT DOCUMENTS

2005/0078774 A1* 4/2005 Rick et al. .................... 375/344
2006/0193392 A1  8/2006 Kim et al.
(Continued)

FOREIGN PATENT DOCUMENTS

EP    0 851 642 A2    7/1998
EP    0 851 642 A3    7/1998
(Continued)

OTHER PUBLICATIONS

Bousnina et al., "Joint Estimation of the Ricean K-factor and the SNR for SIMO Systems Using Higher Order Statistics", Global Telecommunications Conference (Globecom 2011), Dec. 5, 2011, XP032119426, pp. 1-5.

*Primary Examiner* — Leila Malek
(74) *Attorney, Agent, or Firm* — Birch, Stewart, Kolasch & Birch, LLP

(57) ABSTRACT

The present invention concerns a method for correcting a frequency shift on symbols received by a receiver, each symbol being composed of N samples and of a cyclic prefix of a predetermined number Δ samples, the Δ samples being a copy of Δ samples of the N samples. The receiver: —calculates for each symbol, a correlation between at most the Δ samples of the cyclic prefix and the at most Δ samples among the last samples, —averages the correlations over a number of symbols and determines one smooth frequency shift estimation for each averaged correlation, —calculates an exponential from the smooth frequency shift estimation, delays the received symbols by a delay, —multiplies the exponential by the delayed received symbols.

11 Claims, 5 Drawing Sheets

(51) Int. Cl.
*H04J 11/00* (2006.01)
*H04L 7/00* (2006.01)
*H04L 25/02* (2006.01)

(52) U.S. Cl.
CPC ...... *H04L 27/2607* (2013.01); *H04L 27/2657* (2013.01); *H04L 27/2688* (2013.01); *H04J 2011/0096* (2013.01); *H04L 25/0222* (2013.01)

(58) Field of Classification Search
CPC ............. H04L 27/2607; H04L 27/2678; H04L 27/266; H04L 27/2647; H04L 27/2655; H04L 1/0045
USPC .................. 375/340, 343, 316, 354; 370/350
See application file for complete search history.

(56) References Cited

U.S. PATENT DOCUMENTS

| | | | | |
|---|---|---|---|---|
| 2008/0151980 | A1* | 6/2008 | Lindoff et al. | 375/226 |
| 2008/0198948 | A1* | 8/2008 | Tang | 375/316 |
| 2009/0003423 | A1* | 1/2009 | Oh et al. | 375/226 |
| 2010/0266077 | A1 | 10/2010 | Li et al. | |
| 2011/0159831 | A1* | 6/2011 | Jiang | H04L 25/0204 455/226.3 |
| 2011/0216865 | A1* | 9/2011 | Qi et al. | 375/371 |

FOREIGN PATENT DOCUMENTS

| | | |
|---|---|---|
| JP | 2008-532434 A | 8/2008 |
| JP | 2009-290728 A | 12/2009 |
| JP | 2011-029996 A | 2/2011 |
| WO | WO 2006/094140 A1 | 9/2006 |
| WO | WO 2007/078095 A1 | 7/2007 |

\* cited by examiner

| Low K (0-4) | $\alpha=1$ or $0.5$ $N_1=1$ |
|---|---|
| Medium K (4-10) | $\alpha=1$ or $0.5$ $N_1=3$ |
| High K (>10) | $\alpha=1$ or $0.5$ $N_1=7$ |

Fig. 6

| Low Doppler | Medium Doppler | High Doppler |
|---|---|---|
| $\alpha=0.5$<br>$N_1=1$ or 3 or 5 | $\alpha=1$<br>$N_1=3$ or 5 | $\alpha=1$<br>$N_1=3$ or 5 |

Fig. 7

METHOD, DEVICE AND COMPUTER PROGRAM FOR CORRECTING A FREQUENCY SHIFT ON SYMBOLS RECEIVED BY A RECEIVER

This application is the National Phase of PCT International Application No. PCT/JP2013/073459, filed on Aug. 26, 2013, which claims priority under 35 U.S.C. §119(a) to Patent Application No. EP12/187755.9, filed in EP on Oct. 9, 2012, all of which are hereby expressly incorporated by reference into the present application.

BACKGROUND OF THE INVENTION

Field of the Invention

The present invention relates generally to a method and a device for correcting a frequency shift on received symbols.

Description of Related Art

Cyclic prefix or cyclic postfix insertion named also guard interval insertion is well known in telecommunication systems which use for example OFDM (Orthogonal Frequency Division Multiplexing) or SC-OFDM (Single Carrier Orthogonal Frequency-Division Multiplexing) or SC-FDMA (Single Carrier Frequency Division Multiple Access) or SC-FDE (Single Carrier Frequency Domain Equalisation) technologies.

Inserting a cyclic prefix consists in dividing the sample stream in symbols of N samples and inserting at predetermined number $\Delta$ of samples at the beginning of each symbol. The $\Delta$ samples are a copy of the last $\Delta$ samples of the symbol.

Inserting a cyclic postfix consists in dividing the sample stream in symbols of N samples and inserting at predetermined number $\Delta$ of samples at the end of each symbol. The $\Delta$ samples are a copy of the first $\Delta$ samples of the symbol.

Classically, a cyclic prefix is inserted at the beginning of each OFDM or SC-OFDM or SC-FDMA or SC-FDE symbol or a postfix prefix is inserted at the end of each OFDM or SC-OFDM or SC-FDMA or SC-FDE symbol. This is the case for most standards implementing OFDM technology and cyclic prefix like DVB-T (Digital Video Broadcasting-Terrestrial), DVB-T2 (Digital Video Broadcasting-Terrestrial 2), DVB-NGH (Digital Video Broadcasting-Next Generation Handheld), 802.11 family, WiMax, DAB (Digital Audio Broadcasting).

Cyclic prefix or cyclic postfix enables time and frequency synchronisation, reduces or suppresses inter-symbol interference, allows simple equalisation in the frequency domain and enables to measure an instantaneous frequency shift on a symbol basis.

For example, in the paper of J. Van de Beek, Magnus Sandell, Per Ola Börjesson entitled 'ML Estimation of Time and Frequency Offset in OFDM Systems', published in IEEE Transactions on Signal Processing', July 1997, a cyclic prefix can be used to measure an instantaneous frequency shift on a symbol basis.

The estimation is performed in the following way. For each received symbol of size N+$\Delta$, the inner product or the correlation is determined between the first $\Delta$ samples and the last $\Delta$ samples. In case of a frequency drift $f_d$, when neglecting the noise and for the $n^{th}$ symbol, the result is equal to:

$$\Gamma_n = \frac{1}{\Delta}\sum_{i=1}^{\Delta} y_i^* y_{i+N} = e^{j2\pi f_d NT}$$

where T is the sampling time, $y_i$ is the i-th sample and $(.)^*$ is the conjugate of $(.)$.

As the phase of the result is proportional to $f_d$, the phase can be estimated directly. For the $n^{th}$ symbol, the phase estimation is denoted as $$\hat{f}_n = \frac{1}{2\pi NT}\arg(\Gamma_n)$$

where arg(.) is a function which gives the angle of a complex symbol.

It has to be noted here that in case strong echoes exist, it is possible to reduce the related interference by using a number of samples less than $\Delta$ for the calculation of $\Gamma_n$.

In order to allow channel estimation and in particular to follow the time variation of the channel, pilots symbols are regularly inserted within symbols.

The time variations may be due to phase noise of the local oscillator of the receiver, to a lack of frequency synchronisation between transmitter and receiver and/or to the displacement speed of the receiver which generate the Doppler frequency shift.

Let us call $T_s$ the symbol length:

$$T_s = (N+\Delta)T$$

According to the Nyquist theorem, if the pilot symbol insertion rate is $$\frac{1}{MT_s},$$

i.e. a pilot symbol is inserted every M symbol, the bound on the maximum acceptable Doppler shift frequency is:

$$B_f = \frac{1}{2MT_s}$$

For example, this limits the maximum displacement speed at which symbols may be correctly received by the receiver.

Increasing $B_f$ by decreasing M has the drawback to decrease the data throughput.

SUMMARY OF THE INVENTION

The present invention aims at providing a method and a device which enable to compensate time variations due to phase noise of the local oscillator of the receiver and/or to a lack of frequency synchronisation between transmitter and receiver and/or to the displacement speed of the receiver which generate the frequency shift and which enable to increase the maximum frequency shift capability of correction without increasing the number of pilots symbols, by using the cyclic prefix or cyclic postfix of received symbols in order to correct the frequency shift.

To that end, the present invention concerns a method for correcting a frequency shift on symbols received by a receiver, each symbol being composed of N samples and of a cyclic prefix or a cyclic postfix of a predetermined number $\Delta$ samples, the $\Delta$ samples being a copy of $\Delta$ samples of the N samples, characterized in that the method comprises the steps, executed by a receiver, of:

calculating for each symbol, a correlation between at most the $\Delta$ samples of the cyclic prefix and the at most $\Delta$ samples among the last samples or a correlation between at most the Δ samples of the cyclic postfix and the at most Δ among the first samples of the N samples, averaging the correlations over a number of symbols and determining one smooth frequency shift estimation for each averaged correlation or averaging other the number of symbols instantaneous frequency shifts determined from calculated correlations in order to obtain one smooth frequency shift estimation for each symbol, calculating an exponential from the smooth frequency shift estimation, delaying the received symbols by a delay, multiplying the exponential by the delayed received symbols.

The present invention also concerns a device for correcting a frequency shift on symbols received by a receiver, each symbol being composed of N samples and of a cyclic prefix or a cyclic postfix of a predetermined number Δ samples, the Δ samples being a copy of Δ samples of the N samples, characterized in that the device for correcting the frequency shift is included in the receiver and comprises:

means for calculating for each symbol, a correlation between at most the Δ samples of the cyclic prefix and the at most Δ samples among the last samples or a correlation between at most the Δ samples of the cyclic postfix and the at most Δ among the first samples of the N samples, means for averaging the correlations over a number of symbols and determining one smooth frequency shift estimation for each averaged correlation or averaging other the number of symbols instantaneous frequency shifts determined from calculated correlations in order to obtain one smooth frequency shift estimation for each symbol, means for calculating an exponential from the smooth frequency shift estimation, means for delaying the received symbols by a delay, means for multiplying the exponential by the delayed received symbols.

Thus, it is possible to compensate time variations due to phase noise of the local oscillator of the receiver and/or to a lack of frequency synchronisation between transmitter and receiver and/or to the displacement speed of the receiver which generate the Doppler frequency shift.

Furthermore, the present invention enables to increase the maximum frequency shift capability of correction without increasing the number of pilots symbols, by using the cyclic prefix or cyclic postfix of received symbols in order to correct the frequency shift.

According to a particular feature, the receiver weights the smooth frequency shift estimation by a coefficient and the exponential is calculated using the weighted smooth coefficient.

Thus, the noise remaining in the smooth frequency shift estimation is reduced.

According to a particular feature, for each symbols, each smooth frequency shift estimation is determined from the phase of the averaged correlation determined for the symbol.

Thus, the smooth frequency shift estimation is simple to calculate and takes advantage of the cyclic prefix or cyclic postfix.

According to a particular feature, each instantaneous frequency shift is determined from the phase of the correlation calculated for the symbol.

Thus, the instantaneous frequency shift estimation is simple to calculate and takes advantage of the cyclic prefix or cyclic postfix.

According to a particular feature, the number of symbols is equal to three or five and the coefficient is equal to 0.5 or 0.9 or 1.

Thus, the receiver can work at higher speeds without any need of supplementary pilot symbols. The frequency synchronisation performed by the receiver can be simplified.

Furthermore, thanks to the present invention, the receiver can work with local oscillators with higher phase noise and then the cost of the receiver can be reduced.

According to a particular feature, the delay is equal to two or three durations of symbols.

According to a particular feature, the number of symbols and/or the coefficient are determined from channel characteristics between a source and the receiver.

Thus, the performance is optimised according to channel conditions, the channel conditions including impairments of the analogue tuner.

According to a particular feature, the receiver:
estimates a Ricean K-factor of the channel between a source and the receiver and/or estimates the frequency shift excursions using the instantaneous frequency shift estimations,
determines using the a Ricean K-factor and/or the frequency shift excursions, the number of symbols and/or the coefficient.

Thus, the performance of the frequency shift estimation is optimised according to at least one of these channel characteristics.

According to a particular feature, the frequency shift excursion is determined using a sliding window having a duration upper than the duration of the number of symbols over which the average of the estimated instantaneous frequency shifts is performed.

Thus, the frequency excursion is simply estimated, this estimation allows a better optimisation of the number of symbols and/or the coefficient α.

According to a particular feature, the frequency shift excursion is determined using an infinite impulse response filter.

Thus, the frequency excursion is simply estimated, this estimation allows a better optimisation of the number of symbols and/or the coefficient α.

According to a particular feature, the receiver estimates the signal to noise ratio and the Ricean K-factor of the channel is further determined according to the estimated signal to noise ratio.

Thus, the estimation of the Ricean K-factor is improved.

According to a particular feature, the averaging of the estimated instantaneous frequency shifts over a number of symbols comprises further step of delaying the estimated instantaneous or averaged frequency shifts.

Thus, the implementation is easier, by keeping a fixed delay on the data.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatuses according to the invention, they will not be repeated here.

BRIEF DESCRIPTION OF THE DRAWINGS

The characteristics of the invention will emerge more clearly from a reading of the following description of an example of embodiment, the said description being produced with reference to the accompanying drawings, among which:

FIG. 6 is a second example of table used for determining the number of symbols and/or the coefficient according to the second mode of realization of the present invention;

FIG. 7 is a third example of table used for determining the number of symbols and/or the coefficient according to the second mode of realization of the present invention;

DETAILED DESCRIPTION OF THE INVENTION

Figure 1:
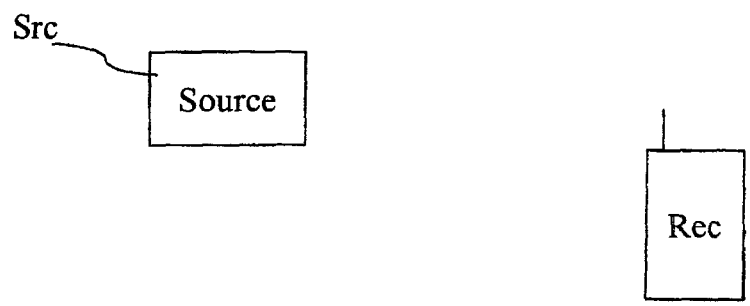
FIG. 1 represents a telecommunication network in which the present invention is implemented.

FIG. 1 represents a telecommunication network in which the present invention is implemented.

The telecommunication network is for example a telecommunication network in which a source Src broadcasts or transmits signals within an area in which at least one receiver Rec is located.

The source Src is for example a terrestrial station or is included in a satellite.

The source Src may be a base station of a wireless cellular telecommunication network.

The source Src may be also a mobile terminal.

Only one source Src is shown in the FIG. 1 for the sake of simplicity, but the network may comprise a more important number of sources Src.

Only one receiver Rec is shown in the FIG. 1 for the sake of simplicity, but signals may be broadcasted or transferred to a more important number of receivers Rec.

The receiver Rec may be a mobile terminal to which data like video signals are broadcasted or a mobile terminal which is in communication with a remote telecommunication device like a mobile phone or with a server or a base station which receives signals from a mobile terminal.

The receiver Rec may be a terrestrial station or is included in a satellite or may be a base station of a wireless cellular telecommunication network which communicates with a mobile terminal.

The present invention is also applicable when the source Src and the receiver Rec have more than one antenna and transfer and receive more than two streams using MIMO scheme.

The signals transferred by the source Src and received by the receiver may be compliant with DVB-T2, DVB-NGH, 802.11 family, WiMax, DAB, or Third Generation Partnership Project Long Term Evolution (3GPP LTE) or Third Generation Partnership Project Long Term Evolution-Advanced (3GPP LTE-A).

According to the invention, the receiver Rec corrects a frequency shift on symbols received by a receiver, each symbol is composed of N samples and of a cyclic prefix or a cyclic postfix of a predetermined number Δ samples, the Δ samples being a copy of Δ samples of the N samples. The receiver Rec:

calculates for each symbol, a correlation between at most the Δ samples of the cyclic prefix and the at most Δ samples among the last samples or a correlation between at most the Δ samples of the cyclic postfix and the at most Δ among the first samples of the N samples, averages the correlations over a number of symbols and determining one smooth frequency shift estimation for each averaged correlation or averaging other the number of symbols instantaneous frequency shifts determined from calculated correlations in order to obtain one smooth frequency shift estimation for each symbol, calculates an exponential from the smooth frequency shift estimation, delays the received symbols by a delay, multiplies the exponential by the delayed received symbols.

The present invention will be disclosed in an example wherein the Doppler frequency shift is compensated. Time variations due to phase noise of the local oscillator of the receiver compensation and/or to lack of frequency synchronisation between transmitter and receiver are also compensated by the present invention.

Figure 2:
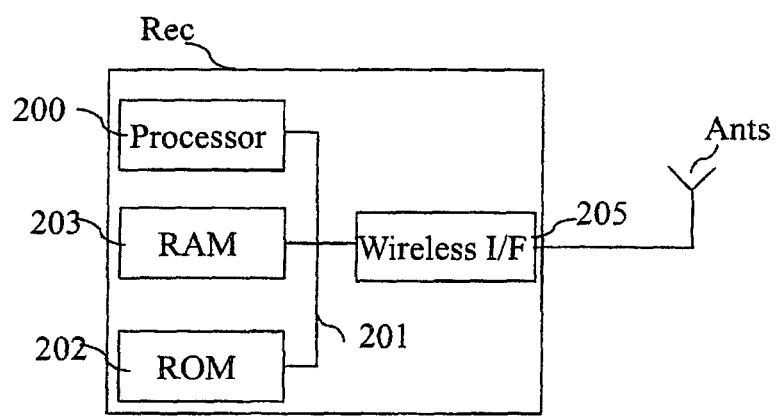
FIG. 2 is a diagram representing the architecture of a receiver in which the present invention is implemented.

FIG. 2 is a diagram representing the architecture of a receiver in which the present invention is implemented.

Figure 8:
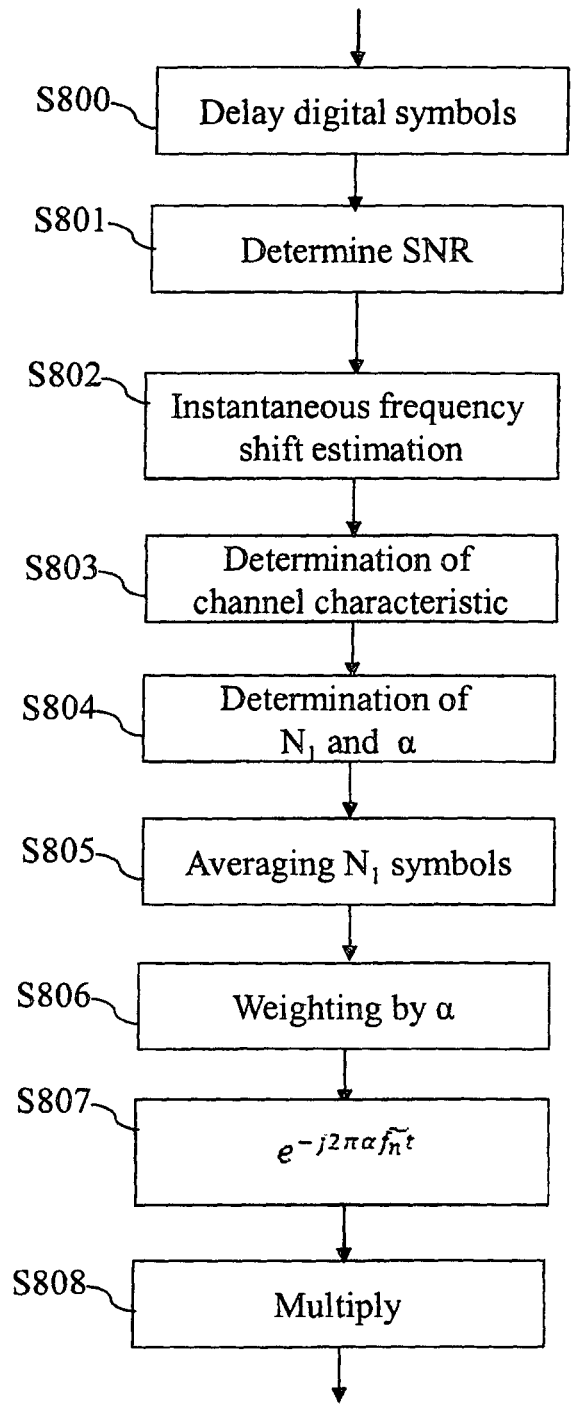
FIG. 8 is an example of an algorithm according to the second mode of realization of the present invention.

The receiver Rec has, for example, an architecture based on components connected together by a bus 201 and a processor 200 controlled by the program as disclosed in FIG. 8.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 8.

The processor 200 controls the operation of the wireless interface 205.

The read only memory 202 contains instructions of the program related to the algorithm as disclosed in FIG. 8, which are transferred, when the receiver Rec is activated, to the random access memory RAM 203.

The wireless interface 205 comprises means for receiving symbols and to correct Doppler frequency shift according to the present invention.

The wireless interface 205 is connected to at least one antenna Ants used for receiving signals.

Figure 3:
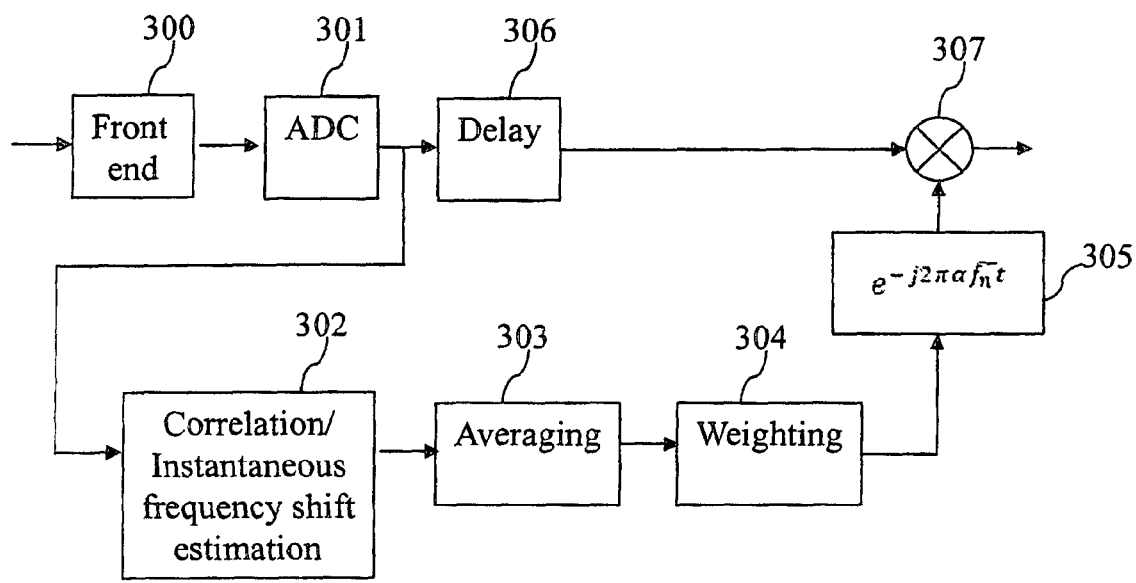
FIG. 3 discloses a block diagram of components of a wireless interface of the receiver according to a first mode of realization of the present invention.
Figures 4, 5:
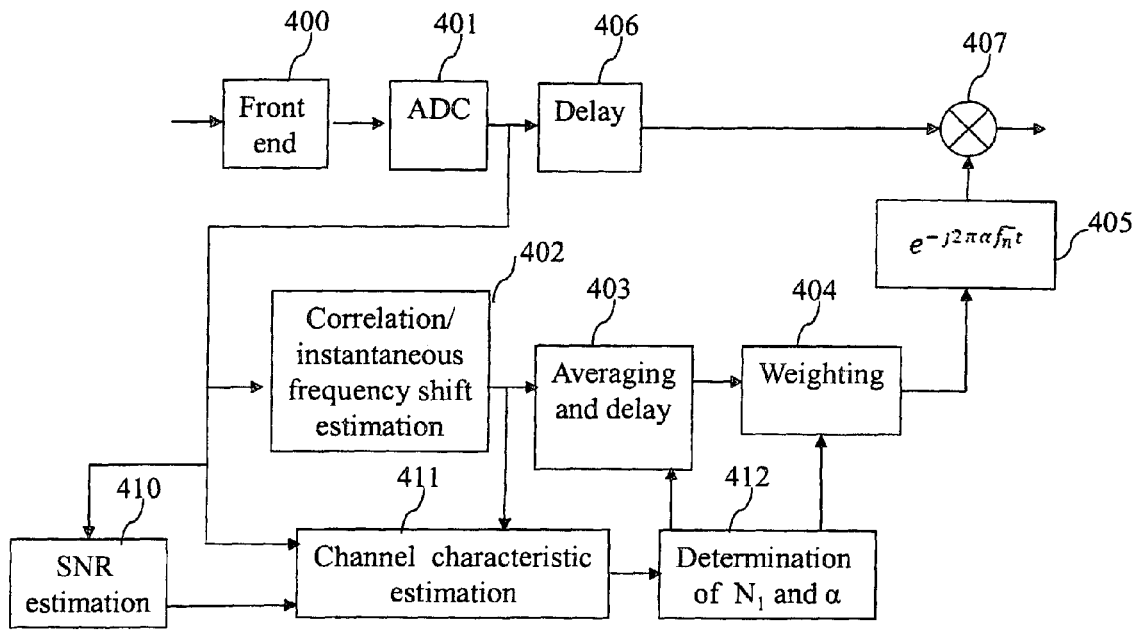
FIG. 4 discloses a block diagram of components of a wireless interface of the receiver according to a second mode of realization of the present invention.
FIG. 5 is a first example of table used for determining the number of symbols and/or the coefficient according to the second mode of realization of the present invention.

The wireless interface 205 comprises components as disclosed in FIG. 3 or 4.

Any and all steps of the algorithm described hereafter with regard to FIG. 6 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the receiver Rec includes circuitry, or a device including circuitry, causing the receiver Rec to perform the steps of the algorithm described hereafter with regard to FIG. 6. Such a device including circuitry causing the receiver Rec to perform the steps of the algorithm described hereafter with regard to FIG. 8 may be an external device connectable to the receiver Rec.

The receiver Rec may also be a part of another device, for example when the receiver Rec is a chip, a chipset, or a module.

FIG. 3 discloses a block diagram of components of a wireless interface of the receiver according to a first mode of realization of the present invention.

The wireless interface 205 comprises a front end module 300 which is composed of classical analogue filters, frequency conversion means and analogue amplifiers.

The wireless interface 205 comprises an analogue to digital converter ADC 301 which is connected to the output of the front end module 300.

The digitally converted symbols are transferred to a delay module 306 and to a correlation module 302.

The correlation module 302 takes, for each symbol, the inner product or the correlation between at most the first $\Delta$ samples and the at most $\Delta$ last samples in order to obtain, when the first $\Delta$ samples and the $\Delta$ last samples are taken:

$$\Gamma_n = \frac{1}{\Delta} \sum_{i=1}^{\Delta} y_i^* y_{i+N}$$

Where $y_i$ is the i-th sample, $(\ )^*$ denotes the conjugate of $(\ )$.

In case the angle of arrival of the different transmission paths are not uniformly distributed, the Doppler effect can be modelled by a frequency shift f(t) which is variable with time but can be considered as almost constant during one symbol duration:

$$f(t) \cong f_n \text{ for } t \in [nT_s, (n+1)T_s[$$

Then, $$\Gamma_n \cong e^{j2\pi f_n NT}$$

Where $f_n$ is the instantaneous frequency shift for each symbol.

The correlation module 302 estimates the instantaneous frequency shift for each symbol as $$\hat{f}_n = \frac{1}{2\pi NT} \arg(\Gamma_n)$$

It has to be noted here that instantaneous frequency shift estimation is disclosed here on the cyclic prefix. The same method can be applied for cyclic postfix.

The wireless interface 205 comprises an averaging module 303 which performs an averaging over $N_1$ symbols of the instantaneous frequency shift estimation provided by correlation module 302.

The averaging module 303 produces the smoothed frequency shift estimation $\tilde{f}_n$:

$$\tilde{f}_n = \frac{1}{N_1} \sum_{i=-(N_1-1)/2}^{(N_1-1)/2} \hat{f}_{n+i}$$

It has to be noted here that for the simplicity of the description, we assume that $N_1$ is odd. The present invention is also applicable when $N_1$ is even.

According to a variant of realization, the averaging module 303 produces the smoothed frequency shift estimation $\tilde{f}_n$ by averaging the correlation $\Gamma_n$, in order to produce a smoothed version $\tilde{\Gamma}_n$;

$$\tilde{\Gamma}_n = \frac{1}{N_1} \sum_{i=-(N_1-1)/2}^{(N_1-1)/2} \Gamma_{n+i}$$

According to the variant, the averaging module 303 uses the phase of the average correlation to get the smoothed frequency shift estimation $\tilde{f}_n$:

$$\hat{f}_n = \frac{1}{2\pi NT} \arg(\tilde{\Gamma}_n)$$

According to the first mode of realization, the value of $N_1$ is fixed and is equal to three or five.

The wireless interface 205 comprises a weighting module 304 which weights the smoothed frequency shift estimation $\tilde{f}_n$ by a predetermined value noted $\alpha$.

The predetermined value $\alpha$ is for example equal to 0.5 or 0.9 or 1 and reduces the noise remaining in the smoothed frequency shift estimation $\tilde{f}_n$.

The wireless interface 205 comprises an exponential calculation module 305 which calculates $e^{-j2\pi\alpha\tilde{f}_n t}$ The delay module 306 delays the digital symbols by $N_2=(N_1+1)/2$ symbols in order to compensate the latency of the operations executed by modules 302, 303, 304 and 305.

The output of the exponential calculation module 305 is multiplied to the delayed digital symbols by the multiplier 307 in order to correct the frequency shift.

FIG. 4 discloses a block diagram of components of a wireless interface of the receiver according to a second mode of realisation of the present invention.

The wireless interface 205 comprises a front end module 400 which is composed of classical analogue filters, frequency conversion means and analogue amplifiers.

The wireless interface 205 comprises an analogue to digital converter ADC 401 which is connected to the output of the front end module 400.

The digitally converted symbols are transferred to a delay module 406, to a correlation module 402, to a channel characteristic estimation module 411 and according to a particular mode of realization of the present invention to a Signal to Noise Ratio (SNR) estimation module 410.

The correlation module 402 takes, for each symbol, the inner product or the correlation between at most the first $\Delta$ samples and the at most $\Delta$ last samples in order to obtain, when the first $\Delta$ samples and the $\Delta$ last samples are taken:

$$\Gamma_n = \frac{1}{\Delta} \sum_{i=1}^{\Delta} y_i^* y_{i+N}$$

In case the angle of arrival of the different transmission paths is not uniformly distributed, the Doppler effect can be modelled by a frequency shift f(t) which is variable with time but can be considered as almost constant during one symbol duration:

$$f(t) \cong f_n \text{ for } t \in [nT_s, (n+1)T_s[$$

Then, $$\Gamma_n \cong e^{j2\pi f_n NT}$$

The correlation module 402 estimates the instantaneous frequency shift for each symbol as $$\hat{f}_n = \frac{1}{2\pi NT} \arg(\Gamma_n)$$

It has to be noted here that instantaneous frequency shift estimation is disclosed here on the cyclic prefix. The same method can be applied for cyclic postfix.

The wireless interface 205 comprises an averaging module 403 which performs an averaging over $N_1$ symbols of the frequency estimation provided by the correlation module 402.

$N_1$ is the variable number of symbols used for the averaging and which is provided by a $N_1$ and $\alpha$ determination module 412.

The averaging module 403 produces the smoothed frequency shift estimation $\tilde{f}_n$:

$$\tilde{f}_n = \frac{1}{N_1} \sum_{i=-(N_i-1)/2}^{(N_1-1)/2} \hat{f}_{n+i}$$

It has to be noted here that for the simplicity of the description, we assume that $N_1$ is odd. The present invention is also applicable when $N_1$ is even.

According to a particular mode of realization of the present invention, the averaging module 403 delays the smoothed frequency shift estimation $\tilde{f}_n$ by a time which is equal to the duration $N_1$ max$-N_1$.

According to a variant of realization, the averaging module 403 produces the smoothed frequency estimation $\tilde{f}_n$ by averaging the correlation $\Gamma_n$, in order to produce a smoothed version $\tilde{\Gamma}_n$:

$$\tilde{\Gamma}_n = \frac{1}{N_1} \sum_{i=-(N_i-1)/2}^{(N_1-1)/2} \Gamma_{n+i}$$

According to the variant, the averaging module 403 uses the phase of the smoothed correlation to get the smoothed frequency estimation $\tilde{f}_n$:

$$\tilde{f}_n = \frac{1}{2\pi NT} \arg(\tilde{\Gamma}_n)$$

The wireless interface 205 comprises a weighting module 404 which weights the smoothed frequency shift estimation $\tilde{f}_n$ by a value noted $\alpha$ provided by the $N_1$ and $\alpha$ determination module 412.

The wireless interface 205 comprises an exponential calculation module 405 which calculates $e^{-j2\pi\alpha \tilde{f}_n t}$ The wireless interface 205 comprises a delay module 406, according to the particular mode of realization, which delays the digital symbols by the delay $N_2=(N_1 \text{ max}+1)/2$ symbols in order to compensate the latency of the operations executed by the modules 402, 403, 404 and 405 where $N_1$ max is the maximum number of symbols that can be used for the averaging.

It has to be noted here that in the variant wherein the averaging module 403 does not delay the smoothed frequency shift estimation $\tilde{f}_n$, the delay module 406 delays the digital symbols by the delay $N_2=(N_1+1)/2$ symbols.

The wireless interface 205 comprises a multiplier 407. The output of the exponential calculation module 405 is multiplied to the delayed digital symbols by the multiplier 407 in order to correct the frequency shift.

According to the second mode of realization of the present invention, $N_1$ and/or $\alpha$ are determined according to channel characteristic estimation.

According to the second mode of realization, the channel is considered to be a Rice channel and a Ricean K-factor is considered.

The Ricean K-factor is defined as the ratio of signal power in dominant component over the local-mean scattered power.

For a Ricean K-factor which is equal, for example to a value lower than one, the channel is considered as a Rayleich channel with multiple paths and no direct path.

For a Ricean K-factor which is equal for example to a value comprised between one to ten, the channel is considered as a Rice channel with multiple paths.

For a Ricean K-factor which is equal for example to a value upper than ten, the channel is considered as almost a pure direct path.

According to a particular feature, the wireless interface 205 comprises a SNR estimation module 410 which estimates the Signal to Noise Ratio and provides it to the channel characteristic estimation module 411.

The SNR is, for example, estimated by using the received pilots symbols as disclosed in the European Patent Application EP2031760.

The SNR is for example a theoretical SNR value which corresponds to a break point of the performance curve of the constellation used by the source Src for transferring symbols and/or the code rate used by the source Src for transferring symbols.

The channel characteristic estimation module 411 estimates the Ricean K-factor and/or the frequency excursion like the Doppler frequency excursion.

For the purpose of frequency shift correction like for fast Doppler frequency shift, the determination of the Ricean K-factor may be performed in order to estimate how preponderant is the direct path.

For example, the Ricean K-factor may be estimated as in the paper of Kareem E. Baddour, Tricia J. Willink entitled "Improved Estimation of the Ricean K=-factor from I/Q Fading Channel Samples", published IEEE Transactions on Wireless Communications, Vol. 7, N° 12, December 2008

For example, the channel characteristic estimation module 411 uses the instantaneous frequency estimations $\hat{f}_n$ which are provided by the correlation module 402 or determines the instantaneous frequency estimations $\hat{f}_n$ in the same way as the one performed by the correlation module 402.

The channel characteristic estimation module 411 analyses the variations of instantaneous frequency estimation $\hat{f}_n$ from one symbol to the other. Many techniques are available to analyse the variations of a signal.

For example, the channel characteristic estimation module 411 calculates the average of the frequency estimation on a window of size $2L_1+1$, with $L_1$ not necessarily being equal to $(N_1-1)/2$:

$$\lambda_n = \frac{1}{2L+1} \sum_{i=-L}^{L} \hat{f}_{n+i}$$

The channel characteristic estimation module 411 calculates the normalised standard deviation in a window of size $2L_2+1$:

$$\mu_n = \text{normalised std}(\lambda_{n+i}, i \in [-L_2, L_2])$$

The channel characteristic estimation module 411 averages $\mu_n$ on some consecutive symbols and compares to some thresholds. The results of these comparisons provide an estimation of the Ricean K-factor.

For example, a first and a second thresholds are used for estimating the Ricean K-factor. The first threshold is used in order to determine if the Ricean K-factor is upper than or equal to four and the second threshold is used in order to determine if the Ricean K-factor is upper than or equal to ten. The values of the thresholds depend on the SNR.

For example, the first threshold is equal to 0.2 for SNR upper than eight dB, is equal to 0.3 for SNR comprised between three to eight dB and is equal to 0.5 for SNR lower than three dB.

For example, the second threshold is equal to 0.13 for SNR upper than eight dB, is equal to 0.25 for SNR comprised between three to eight dB and is equal to 0.45 for SNR lower than three dB.

The channel characteristic estimation module 411 may estimate the Doppler frequency shift excursion $dr_n$ or $dr'_n$ or $dr''_n$ or $dr'''_n$ or $dr''''_n$ using the instantaneous frequency estimations $\hat{f}_n$.

For example, the channel characteristic estimation module 411 estimates the Doppler frequency shift excursions $dr_n$ using some sliding windows:

$$dr_n = \frac{1}{2A+1} \sum_{i=-A}^{A} |\hat{f}_{n+i}|$$

Where typically $A \gg N_1$

For example, the channel characteristic estimation module 411 estimates the Doppler frequency shift excursions $dr'_n$ using some sliding windows:

$$dr'_n = \sqrt{\frac{1}{2A+1} \sum_{i=-A}^{A} \hat{f}_{n+i}^2}$$

For example, the channel characteristic estimation module 411 estimates the Doppler frequency shift excursions $dr''_n$ using some sliding windows:

$$d''r_n = \max(|\hat{f}_{n+i}|), \text{ for } i \in [-A, +A]$$

For example, the channel characteristic estimation module 411 estimates the Doppler frequency shift excursions $dr'''_n$ using some sliding windows:

$$d'''=\max(|\hat{f}_{n+i}|), \text{ for } i \in [-A, +A]$$

And compares the result to different thresholds.

For example, the channel characteristic estimation module 411 estimates the Doppler frequency shift excursions using an Infinite Impulse Response (IIR) filter:

$$d''''r_n = cd''''r_{n-1} + d|\hat{f}_n|$$

with $d''''r_0 = 0$.

Where c and d are the coefficients of the IIR filter. For example c is equal to 0.1 and d is equal to 0.9.

The determined Ricean K-factor and/or the estimates of the Doppler frequency shift excursion are provided to the $N_1$ and $\alpha$ determination module 412.

The $N_1$ and $\alpha$ determination module 412 determines the values of $N_1$ and $\alpha$ using a table as the one shown in FIG. 5 or FIG. 6 or FIG. 7.

FIG. 5 is a first example of table used for determining the number of symbols and/or the coefficient according to the second mode of realization of the present invention;

In the first example of table, both Ricean K-factor and the estimates of the Doppler frequency shift excursion are used for determining the number of symbols and/or the coefficient.

From a general point of view, for a very low Doppler frequency shift excursion, $\alpha$ is equal to zero, i.e. no correction is applied.

For low Doppler frequency shift excursion, for example lower than Bf/2, and Ricean K-factor lower than four, $\alpha$ is equal to 0.5 and $N_1$ is equal to 1 where Bf is the Nyquist frequency bound.

For low Doppler frequency shift excursion and Ricean K-factor comprised between four and ten, $\alpha$ is equal to 0.5 and $N_1$ is equal to 3.

For low Doppler frequency shift excursion and Ricean K-factor upper than ten, $\alpha$ is equal to 0.5 and $N_1$ is upper than or equal to 7.

For medium Doppler frequency shift excursion, for example between Bf/2 and 2Bf, and Ricean K-factor lower than four, $\alpha$ is equal to 1 and $N_1$ is equal to 1.

For medium frequency shift excursion and K comprised between four and ten, $\alpha$ is equal to 1 and $N_1$ is equal to 1.

For medium Doppler frequency shift excursion and Ricean K-factor upper than ten, $\alpha$ is equal to 0.5 and $N_1$ is upper than or equal to 7.

For high Doppler frequency shift excursion, for example upper than 2Bf, and Ricean K-factor lower than four, $\alpha$ is equal to 1 and $N_1$ is equal to 1.

For high frequency shift excursion and Ricean K-factor comprised between four and ten, $\alpha$ is equal to 1 and $N_1$ is equal to 3.

For high Doppler frequency shift excursion and Ricean K-factor upper than ten, $\alpha$ is equal to 0.5 and $N_1$ is upper than or equal to 7.

FIG. 6 is a second example of table used for determining the number of symbols and/or the coefficient according to the second mode of realization of the present invention.

In the second example of table, only Ricean K-factor is used for determining the number of symbols and/or the coefficient.

For a Ricean K-factor lower than four, $\alpha$ is equal to 0.5 or 1 and $N_1$ is equal to 1.

For a Ricean K-factor comprised between four and ten, $\alpha$ is equal to 0.5 or 1 and $N_1$ is equal to 3.

For a Ricean K-factor upper than ten, α is equal to 0.5 or 1 and $N_1$ is upper than or equal to 7.

FIG. 7 is a third example of table used for determining the number of symbols and/or the coefficient according to the second mode of realization of the present invention.

In the third example of table, only the estimate of the Doppler frequency shift excursion is used for determining the number of symbols and/or the coefficient.

For low Doppler frequency shift excursion, for example lower than Bf/2, α is equal to 0.5 and $N_1$ is equal to 1 or 2 or 5 where Bf is the Nyquist frequency bound.

For medium Doppler frequency shift excursion, for example between Bf/2 and 2Bf, α is equal to 0.5 and $N_1$ is equal to 3 or 5.

For high Doppler frequency shift excursion, for example upper than 2Bf, α is equal to 1 and $N_1$ is equal to 3 or 5.

FIG. 8 is an example of an algorithm according to the second mode of realization of the present invention.

More precisely, the present algorithm is executed by the processor 200.

According to a particular mode of realization of the present invention, at step S800, the processor 200 commands the delay module 406 in order to delay the digital symbols by the delay $N_2=(N_1 \text{ max}+1)/2$ in order to compensate the latency of the operations executed by the modules 402, 403, 404 and 405.

According to a variant of realization of the present invention wherein the averaging module 403 does not delay the instantaneous frequency shift, at step S800, the processor 200 commands the delay module 406 in order to delay the digital symbols by the delay $N_2=(N_1+1)/2$.

According to a particular feature, at next step S801, the processor 200 commands the SNR estimation module 410 to estimate the Signal to Noise Ratio and to provide it to the channel characteristic estimation module 411.

The SNR is, for example, estimated by using the received pilots symbols as disclosed in the European Patent Application EP2031760.

The SNR is for example a theoretical SNR value which corresponds to a break point of the performance curve of the constellation used by the source Src for transferring symbols and/or the code rate used by the source Src for transferring symbols.

At next step S802, the processor 200 commands the correlation module 402 to take, for each symbol, the inner product or the correlation between at most the first Δ samples and the at most Δ last samples in order to obtain, when the first Δ samples and the Δ last samples are taken:

$$\Gamma_n = \frac{1}{\Delta}\sum_{i=1}^{\Delta} y_i^* y_{i+N}$$

In case the angle of arrival of the different transmission paths is not uniformly distributed, the Doppler effect can be modelled by a frequency shift f(t) which is variable with time but can be considered as almost constant during one symbol duration:

$$f(t) \cong f_n \text{ for } t \in [nT_s,(n+1)T_s[$$

Then, $$\Gamma_n \cong e^{j2\pi f_n NT}$$

The correlation module 402 estimates the instantaneous frequency shift for each symbol as $$\hat{f}_n = \frac{1}{2\pi NT}\arg(\Gamma_n)$$

It has to be noted here that instantaneous frequency shift estimation is disclosed here on the cyclic prefix. The same method can be applied for cyclic postfix.

At next step S803, the processor 200 commands the channel characteristic estimation module 411 in order to estimate the Ricean K-factor and/or the frequency excursion like the Doppler frequency excursion.

For the purpose of frequency shift correction like for fast Doppler frequency shift, the determination of the Ricean K-factor may be performed in order to estimate how preponderant is the direct path.

For example, the channel characteristic estimation module 411 uses the instantaneous frequency estimations $\hat{f}_n$ which are provided by the correlation module 402 or determines the instantaneous frequency estimations $\hat{f}_n$ in the same way as the one performed by the correlation module 402.

The channel characteristic estimation module 411 analyses the variations of instantaneous frequency estimation $\hat{f}_n$ from one symbol to the other. Many techniques are available to analyse the variations of a signal.

For example, the channel characteristic estimation module 411 calculates the average of the frequency estimation on a window of size $2L_1+1$, with $L_1$ not necessarily being equal to $(N_1-1)/2$:

$$\lambda_n = \frac{1}{2L+1}\sum_{i=-L}^{L} \hat{f}_{n+i}$$

The channel characteristic estimation module 411 calculates the normalised standard deviation in a window of size $2L_2+1$:

$$\mu_n = \text{normalised std}(\lambda_{n+i}, i \in [-L_2, L_2])$$

The channel characteristic estimation module 411 averages $\mu_n$ on some consecutive symbols and compares to some thresholds. The results of these comparisons provide an estimation of the Ricean K-factor.

For example, a first and a second thresholds are used for estimating the Ricean K-factor. The first threshold is used in order to determine if the Ricean K-factor is upper than or equal to four and the second threshold is used in order to determine if the Ricean K-factor is upper than or equal to ten. The values of the thresholds depend on the SNR.

For example, the first threshold is equal to 0.2 for SNR upper than eight dB, is equal to 0.3 for SNR comprised between three to eight dB and is equal to 0.5 for SNR lower than three dB.

For example, the second threshold is equal to 0.13 for SNR upper than eight dB, is equal to 0.25 for SNR comprised between three to eight dB and is equal to 0.45 for SNR lower than three dB.

The channel characteristic estimation module 411 may estimate the Doppler frequency shift excursion $dr_n$ or $dr'_n$ or $dr''_n$ or $dr'''_n$ or $dr''''_n$ using the instantaneous frequency estimations $\hat{f}_n$.

For example, the channel characteristic estimation module 411 estimates the Doppler frequency shift excursions $dr_n$ using some sliding windows:

$$dr_n = \frac{1}{2A+1} \sum_{i=-A}^{A} |\hat{f}_{n+i}|$$

Where typically $A \gg N_1$

For example, the channel characteristic estimation module 411 estimates the Doppler frequency shift excursions $dr'_n$ using some sliding windows:

$$dr'_n = \sqrt{\frac{1}{2A+1} \sum_{i=-A}^{A} \hat{f}_{n+i}^2}$$

For example, the channel characteristic estimation module 411 estimates the Doppler frequency shift excursions $dr''_n$ using some sliding windows:

$$d''r_n = (|\hat{f}_{n+i}|), \text{ for } i \in [-A, +A]$$

For example, the channel characteristic estimation module 411 estimates the Doppler frequency shift excursions $dr'''_n$ using some sliding windows:

$$d'''r_n = \max(|\tilde{f}_{n+i}|), \text{ for } i \in [-A, +A]$$

and compares the result to different thresholds.

For example, the channel characteristic estimation module 411 estimates the Doppler frequency shift excursions using an Infinite Impulse Response (IIR) filter:

$$d''''r_n = c d''''r_{n-1} + d|\hat{f}_n|$$

with $d''''r_0 = 0$.

Where c and d are the coefficients of the IIR filter. For example c is equal to 0.1 and d is equal to 0.9.

The determined Ricean K-factor and/or the estimates of the Doppler frequency shift excursion are provided to the $N_1$ and $\alpha$ determination module 412.

At next step S804, the processor 200 commands the $N_1$ and $\alpha$ determination module 412 in order to determine using one of the tables as the one shown in FIG. 5 or FIG. 6 or FIG. 7, the values of $N_1$ and $\alpha$.

At next step S805, the processor 200 commands the averaging module 403 which performs an averaging over $N_1$ symbols of the frequency estimation provided by the correlation module 402.

$N_1$ is the variable number of symbols used for the averaging and which is provided by a $N_1$ and $\alpha$ determination module 412.

The averaging module 403 produces the smoothed frequency shift estimation $\tilde{f}_n$:

$$\tilde{f}_n = \frac{1}{N_1} \sum_{i=-(N_1-1)/2}^{(N_1-1)/2} \hat{f}_{n+i}$$

It has to be noted here that for the simplicity of the description, we assume that $N_1$ is odd. The present invention is also applicable when $N_1$ is even.

According to a particular mode of realization of the present invention, the averaging module 403 delays the smoothed frequency shift estimation $\tilde{f}_n$ by a time which is equal to the duration $N_1 \max - N_1$.

According to a variant of realization, the averaging module 403 produces the smoothed frequency estimation $\tilde{f}_n$ by averaging the correlation $\Gamma_n$, in order to produce a smoothed version $\tilde{\Gamma}_n$;

$$\tilde{\Gamma}_n = \frac{1}{N_1} \sum_{i=-(N_1-1)/2}^{(N_1-1)/2} \Gamma_{n+i}$$

According to the variant, the averaging module 403 uses the phase of the smoothed correlation to get the smoothed frequency estimation $\tilde{f}_n$:

$$\tilde{f}_n = \frac{1}{2\pi NT} \arg(\tilde{\Gamma}_n)$$

At next step S806, the processor 200 commands the weighting module 404 in order to weight the smoothed frequency estimation $\tilde{f}_n$ by the value $\alpha$.

At next step S807, the processor 200 commands the exponential calculation module 405 which calculates $e^{-j2\pi\alpha \tilde{f}_n t}$ At next step S808, the processor 200 commands the multiplier 407 in order to multiply the delayed digital symbols by the output of the exponential calculation module in order to correct the Doppler frequency shift.

Naturally, many modifications can be made to the embodiments of the invention described above without departing from the scope of the present invention.

The invention claimed is:

1. Method for correcting a frequency shift on symbols received by a receiver, each symbol being composed of N samples, where N is a non-zero positive integer and of a cyclic prefix or a cyclic postfix of a predetermined number $\Delta$ samples, where $\Delta$ is a non-zero positive integer, the $\Delta$ samples being a copy of $\Delta$ samples of the N samples, wherein the method comprises the steps, executed by a receiver, of:
   calculating for each symbol, a correlation between at most the $\Delta$ samples of the cyclic prefix and the at most $\Delta$ samples among the last samples or a correlation between at most the $\Delta$ samples of the cyclic postfix and the at most $\Delta$ samples among the first samples of the N samples,
   averaging, over the number of symbols, the instantaneous frequency shifts determined from one or more calculated correlations in order to obtain one smooth frequency shift estimation for each symbol,
   calculating an exponential from the smooth frequency shift estimation,
   delaying the received symbols by a delay,
   multiplying the exponential by the delayed received symbols,
   estimating a Ricean K-factor of the channel between a source and the receiver and/or estimating frequency shift excursions using the determined instantaneous frequency shifts,
   determining using the Ricean K-factor and/or the frequency shift excursions, the number of symbols and/or a coefficient, and
   wherein the number of symbols and the coefficient are determined from channel characteristic between the source and the receiver; and wherein each instantaneous frequency shift is determined from the phase of the correlation calculated for the symbol.

2. Method according to claim 1, wherein the method comprises further step of weighting the smooth frequency shift estimation by a weighted smooth coefficient and in that the exponential is calculated using the weighted smooth coefficient.

3. Method according to claim 1, wherein, for each symbol, each smooth frequency shift estimation is determined from the phase of the correlation determined for the symbol.

4. Method according to claim 1, wherein the number of symbols is equal to three or five and the coefficient is equal to 0.5 or 0.9 or 1.

5. Method according to claim 4, wherein the delay is equal to two or three times the durations of symbols.

6. Method according to claim 1, wherein the frequency shift excursion is determined using a sliding window having a duration upper than the duration of the number of symbols over which the average of the estimated instantaneous frequency shifts is performed.

7. Method according to claim 1, wherein the frequency shift excursions are determined using an infinite impulse response filter.

8. Method according to claim 1, wherein the method comprises further step of:
estimating the signal to noise ratio and determining the Ricean K-factor of the channel according to the estimated signal to noise ratio.

9. Method according to claim 1, wherein the averaging of the instantaneous frequency shifts over a number of symbols comprises further step of delaying the instantaneous or averaged frequency shifts.

10. Device for correcting a frequency shift on symbols received by a receiver, each symbol being composed of N samples, where N is a non-zero positive integer and of a cyclic prefix or a cyclic postfix of a predetermined number $\Delta$ samples, where $\Delta$ is a non-zero positive integer, the $\Delta$ samples being a copy of $\Delta$ samples of the N samples, wherein the device for correcting the frequency shift is included in the receiver and comprises:
means for calculating for each symbol, a correlation between at most the $\Delta$ samples of the cyclic prefix and the at most $\Delta$ samples among the last samples or a correlation between at most the $\Delta$ samples of the cyclic postfix and the at most $\Delta$ samples among the first samples of the N samples,
means for averaging, over the number of symbols, the instantaneous frequency shifts determined from one or more calculated correlations in order to obtain one smooth frequency shift estimation for each symbol,
means for calculating an exponential from the smooth frequency shift estimation,
means for delaying the received symbols by a delay,
means for multiplying the exponential by the delayed received symbols,
estimating a Ricean K-factor of the channel between a source and the receiver and/or estimating frequency shift excursions using the determined instantaneous frequency shifts,
determining using the Ricean K-factor and/or the frequency shift excursions, the number of symbols and/or a coefficient, and
wherein the number of symbols and the coefficient are determined from channel characteristic between the source and the receiver; and
wherein each instantaneous frequency shift is determined from the phase of the correlation calculated for the symbol.

11. A non-transitory computer readable medium having stored thereon a computer program which can be directly loadable into a programmable device, comprising instructions or portions of code for implementing the steps of the method according to claim 1 when said computer program is executed on a programmable device.

* * * * *